A. X. PFEIFFER.
TIRE ARMOR.
APPLICATION FILED FEB. 10, 1919.
1,332,001.
Patented Feb. 24, 1920.
2 SHEETS—SHEET 2.
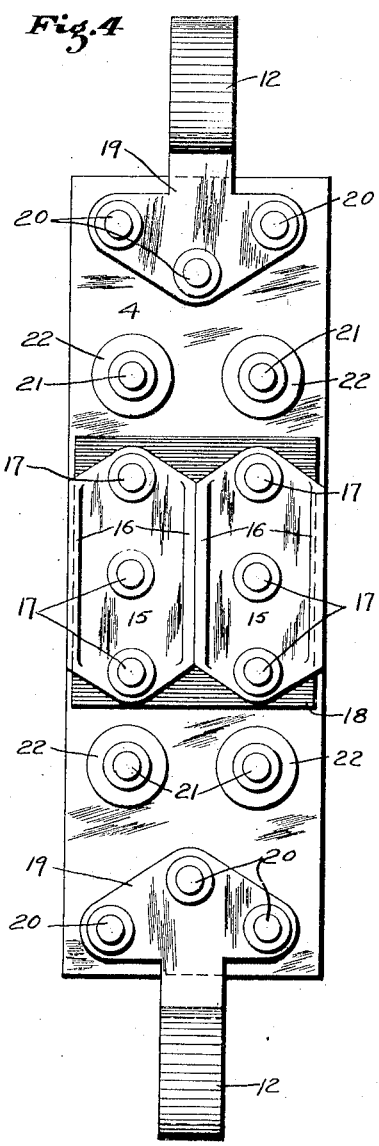
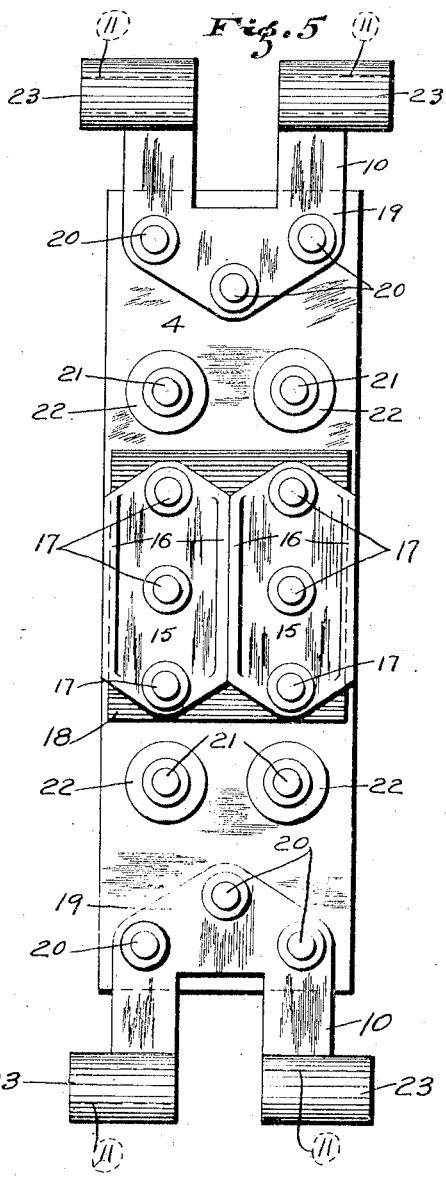
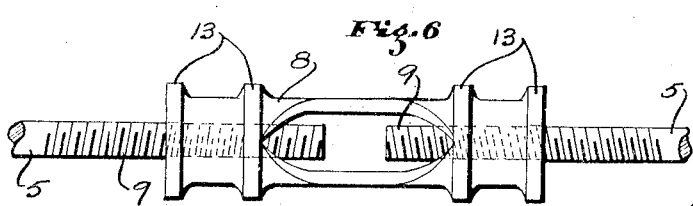
INVENTOR:
Adolph X. Pfeiffer,
BY
Hugh K. Wagner
ATTORNEY

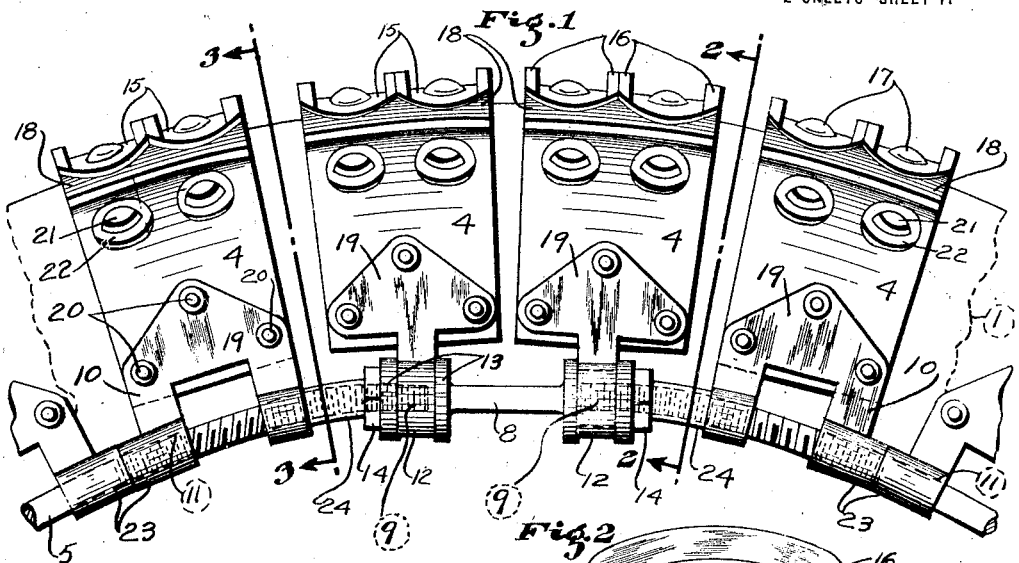
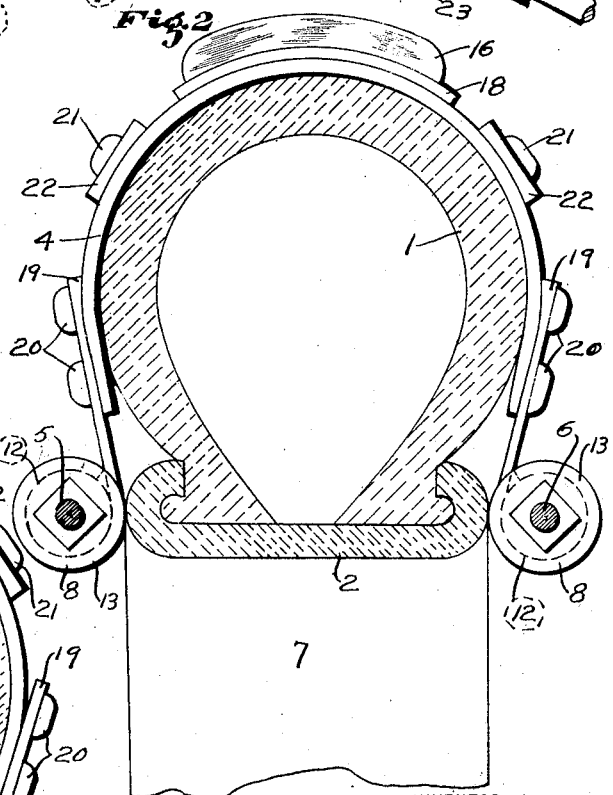
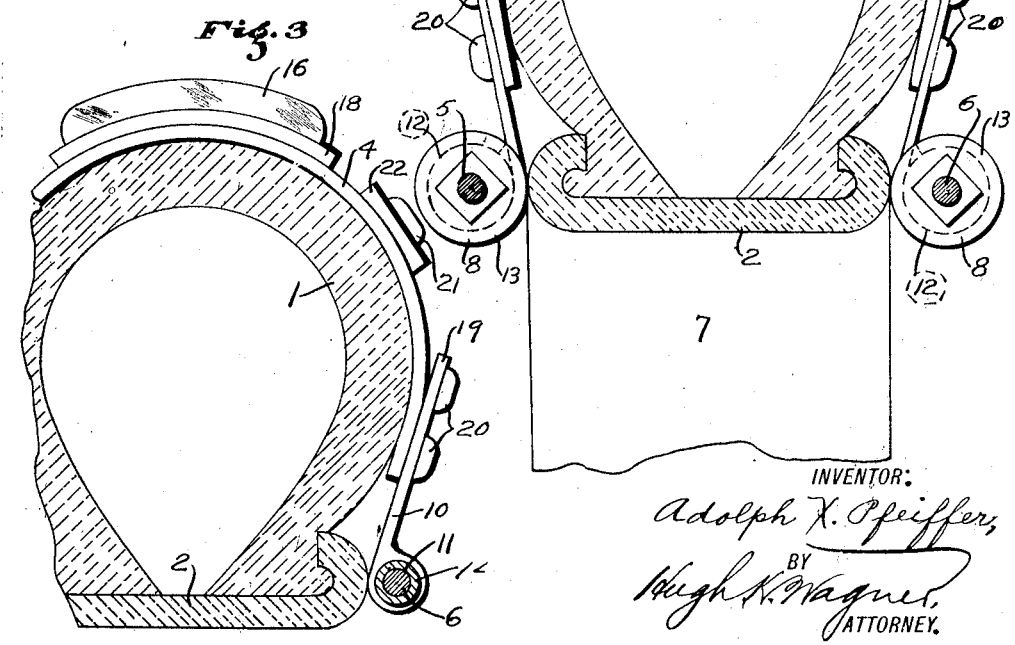

UNITED STATES PATENT OFFICE.

ADOLPH X. PFEIFFER, OF ST. LOUIS, MISSOURI.

TIRE-ARMOR.

1,332,001. Specification of Letters Patent. Patented Feb. 24, 1920.

Application filed February 10, 1919. Serial No. 276,446.

*To all whom it may concern:*

Be it known that I, ADOLPH X. PFEIFFER, a citizen of the United States, residing at the city of St. Louis, in the State of Missouri, have invented certain new and useful Improvements in Tire-Armor, of which the following is a specification.

This invention relates to armor for the tires of motor vehicle wheels or the like, and has for its object the simplification and lightening of such devices, and, moreover, this invention relates more particularly to improvements in the device of my invention described in my United States Patent, 1,300,766 dated April 15, 1919.

An object of the present invention is to provide a simplified attaching means for holding the armor units attached to the tire in such a manner that parts will not become detached and lost when a tire is partially or entirely deflated.

Another object of this invention is to provide a simplified means of preventing or limiting creepage of the armor.

Other objects and the advantages of this invention are hereinafter described, and are set forth in the claims.

In the accompanying drawings forming part of this specification, in which like numbers of reference denote like parts wherever they occur, Figure 1 is a fragmentary side elevation of a wheel with this tire armor attached, showing the same at the turnbuckle, or means for joining the ends of the circumferential locking means;

Fig. 2 is a sectional view on the line 2—2 in Fig. 1 looking in the direction indicated by the arrows;

Fig. 3 is a sectional view on the line 3—3 in Fig. 1 looking in the direction indicated by the arrows;

Fig. 4 is a plan view of one of the units located near the turnbuckle;

Fig. 5 is a plan view of one of the units located elsewhere than at the turnbuckle and elsewhere than immediately adjacent either of the two units at the turnbuckle; and Fig. 6 is a detail of the turnbuckle on an enlarged scale.

The casing 1 may be of any ordinary or desired kind, but is shown in the drawings as of the clencher variety held in the rim 2 in the customary manner. This armor may be used to protect a solid tire, not shown in the drawings.

The armor consists of a series of armor units 4, of which but a few samples are shown in Fig. 1, it being understood that similar units are mounted on and held by rods 5 and 6 around the entire circumference of the wheel 7.

Rods 5 are not threaded, except at the opposite ends of each rod adjacent to the turnbuckle 8. The turnbuckle 8 is shown in Fig. 6 in a position at a right angle to the position of the same in Fig. 1. In Fig. 6 the rods upon which the turnbuckle 8 is screwed may be either rod 5 or rod 6. It will be understood that the rod shown in Fig. 6 is bent into circular form and that it is opposite ends of the same rod that appear in Fig. 6. The same remark is true concerning rod 5 in Fig. 1. A turnbuckle 8 screws upon the threaded ends 9 of each of rods 5 and 6 in a well understood manner, and draws the opposite ends of the rod on which it is placed toward each other and very tightly, with the result of decreasing the circumference of the circle described by its rod, and thereby tending to draw such rod into a position adjacent to or in contact with the rim 2, as shown in Figs. 2 and 3.

Each unit 4 of armor is provided with a pair of oppositely extending bifurcated lugs 10, each lug terminating in a smooth bored eye 11 (a pair of such eyes being provided for each lug,) except the two units 4 located opposite the turnbuckles 8, which last-mentioned units are each provided with loops 12, which encircle the turnbuckle 8 in the manner best seen in Fig. 1, which loops may be substantially closed loops.

The interior of each eye 11, in a row on each side of the wheel, is smooth bored for mounting therethrough rod 5 on one side of the wheel and rod 6 on the opposite side of the wheel, so that the units are slidable along the rods to and from mounted position, and the screw-threaded ends 9 of each rod are fastened together by a turnbuckle 8.

The turnbuckle 8 is provided at each end portion with a pair of spaced-apart flanges 13 adapted to receive a jam nut 14 impinging with each one of the outer of said flanges, and loop 12 encircling the end portion of the turnbuckle 8 between a pair of the said flanges 13.

Each pair of eyes 11 are provided with opposite extensions 23, said extensions being adapted to elongate each one of a pair of eyes 11 in opposite directions circumferentially of the wheel, so that when the full complement of units 4 of armor are mounted in operative position on rods 5 and 6, each extension 23 of one of said units of armor will abut against an adjacent extension 23 of the next adjacent unit of armor, except, of course, in the case of the two units 4 located opposite the turnbuckles 8, the loops 12 of which last-mentioned units encircle the end portions of turnbuckles 8 mounted therein, and each of the two units 4 mounted at the turnbuckle 8 is spaced apart from its next adjacent unit 4 by means of a spacer casing 24 or the like, one end of said casing abutting upon a nut 14 and the other end abutting upon the eye-bearing portion of an eye 11 from which the extension 23 has been removed or shortened to accommodate the said spacer casing 24, as best seen in Fig. 1, so that nut 14 and turnbuckle 8 may be adjusted conveniently.

The units 4, mounted on opposite end portions of turnbuckle 8, are spaced apart from each other by the inner one of each pair of flanges 13.

When, therefore, a full complement of units is mounted and the parts assembled, as above described, in position upon a wheel, the turnbuckles 8 may be adjusted to tightening position, and it will be seen that bodies of units 4 are spaced apart from each other by means of eye-extensions 23, except in the case of the two units 4 at turnbuckle 8, which are spaced apart from each other by two of the flanges 13, except in the case of each of the said two units 4 at turnbuckle 8 and the next adjacent units 4 on each side of the said two units, for which spacer casings 24 provide the spacing means.

By means of the construction of parts hereinabove described, the creepage of armor units operatively mounted on a wheel is reduced to a minimum or entirely prevented without the use of a substantially continuously screw-threaded rod or pair of rods described in my prior application for patent above referred to and without the screw-threaded eyes described in said application, and the elimination of the said screw-threaded portions and the substitution therefor of the construction of parts hereinabove described in the present invention is a simpler and cheaper construction and much facilitates the assembling the parts of an armor into operative position, and the creepage of armor units 4 is effectively and simply prevented.

It is, of course, understood that, if for any reason one or more units 4 of the present invention forming a full complement of armor units 4 for a wheel of given diameter are omitted or removed from any position, except the two units 4 at turnbuckle 8, one or more spacer casings (not shown), similar in general character to spacer casing 24, and of suitable length, may be mounted on rods 5 and 6 in place of such of the said armor units 4 omitted or removed, and thus the creepage of the remaining armor units 4 will be prevented.

Each armor unit is provided with a pair of armor plates 15, each of which has projecting outwardly therefrom and perpendicular thereto a flange 16, the center pair of which flanges abut each other, as best seen in Fig. 1. These flanges 16 are about a quarter of an inch in height of projection away from their respective plates 15, and are therefore adapted to prevent skidding. The space between lugs 10 is preferably about an inch and three-quarters.

Preferably interposed between the main body of each armor unit 4 and the plates 15 is a fabric washer 18.

Tongues 19 are attached by rivets 20 to the main body of unit 4.

Rivets 21 and washers 22 are so located on the main body of unit 4 that they protect the fabric or leather, of which the same is composed, from wear upon the side of ruts of tires smaller in circumference than the tires upon which this armor is used. The size of tires upon which this armor can be used is immaterial, and it may be used upon all sizes; but if used upon a size larger than ruts in the road made by other tires, rivets 21 and washers 22 will prevent wear upon the body of the armor units 4 until rivets 21 and washers 22 are worn out.

The attempt has heretofore been made to hold armor units of different construction from those herein shown and described upon a wheel by the use of separable plates or pieces, but this has been found especially objectionable in the case of flat tires, because complete distention of the tire is necessary to hold the said loose pieces in place. When the tire becomes flat, these loose pieces fall out and are lost upon the road, and new ones have to be bought in their place. In this invention, the armor units 4 are held in such manner upon the rods 5 and 6 and mounted thereon through eyes 11 that they can not get loose on account of a flat tire or other reason, but must, when desired, be removed therefrom by hand.

The rivets 21 and 17 are preferably round-headed rivets, the heads of which project a material distance outwardly and form a wearing surface of considerable endurance.

Loops 12 impinge against flanges 13 on the turnbuckle 8 and prevent movement of the armor unit or units opposite the turnbuckle 8 or turnbuckles 8 in either direction.

The flanges 16 are preferably more or less sharp or angular-curved.

Having thus described this invention, I hereby reserve the benefit of all changes in form, arrangement, order, or use of parts, as it is evident that many minor changes may be made therein without departing from the spirit of this invention or the scope of the following claims.

I claim:

A tire armor comprising a plurality of tire-engaging units extending transversely thereof, circular rods disposed upon opposite sides of the tire, means for securing the ends of the rods together, plates secured to the units, the plates having integral apertured ears which extend beyond the edges of the plates and through which the rods pass, the extension on the ears holding the units in position on the tire and in spaced relation.

In testimony whereof I hereunto affix my signature.

ADOLPH X. PFEIFFER.